Feb. 11, 1930.  G. FERGUSON  1,746,306
INTERNAL COMBUSTION ENGINE
Filed May 9, 1927

INVENTOR
George Ferguson
By
Pennie, Davis, Marvin & Edmonds
Attorneys.

Patented Feb. 11, 1930

1,746,306

UNITED STATES PATENT OFFICE

GEORGE FERGUSON, OF WINTERTHUR-WULFLINGEN, SWITZERLAND, ASSIGNOR TO THE FIRM: SULZER FRÈRES SOCIÉTÉ ANONYME, OF WINTERTHUR, SWITZERLAND

INTERNAL-COMBUSTION ENGINE

Application filed May 9, 1927, Serial No. 189,886, and in Switzerland May 15, 1926.

This invention relates to internal combustion engines of the double acting type and has for its object to provide an engine in which the interior of the cylinder is more easily accessible than hitherto.

According to the present invention the cylinder and its liner are so constructed and arranged that the uppermost part of the liner, either alone or together with the upper part of the cylinder, may be removed as a whole with the cylinder cover without disturbing any of the joints in the water jacket. Preferably the joint between the upper and lower parts of the cylinder is situated in the neighbourhood of the air inlet and waste gas outlet ports where pressure is low.

Figure 1:
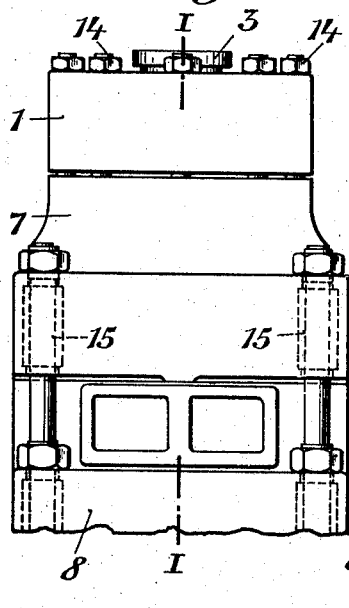
Figure 2:
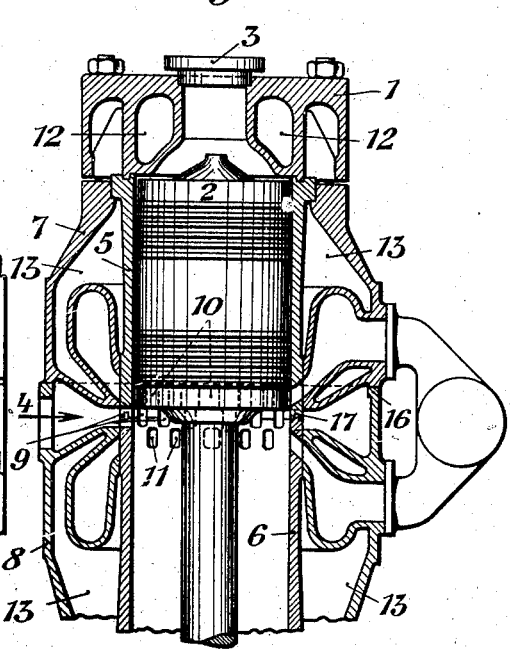

One construction according to the invention is illustrated by way of example in the accompanying drawing, in which Figure 1 shows in outside elevation part of the cylinder of a double acting internal combustion engine, and Figure 2 is a cross-section on the line I—I of Figure 1.

In the construction illustrated in the drawing the cylinder cover 1 is provided with a member 3 adapted to carry the starting and fuel valves. The cylinder has a piston 2 and scavenging air is admitted at 4.

The cylinder liner is divided into two parts 5 and 6 and the cylinder itself into two parts 7 and 8 which are secured together by means of bolts 15 and to the cylinder cover 1 by means of bolts 14. The cover is provided with water jackets 12 and each of the two parts 7 and 8 is provided with a separate water jacket 13.

The joints 16 and 17 between the two parts of the cylinder and its liner are situated in the neighbourhood of the ports for admitting air and for carrying off the waste gases, so that both joints are only subjected to a slight pressure. The ports for admitting scavenging air are indicated at 9 and those through which the exhaust gases escape are shown at 10 and 11.

If the upper part of the cylinder is to be detached it is only necessary to remove the various pipe connections and the bolts 15, and since each part of the cylinder has a separate water jacket the upper part of the cylinder and its liner may be removed as a whole together with the cover 1 without disturbing any of the joints between the water jackets.

It will be appreciated that with an engine constructed according to the present invention not only is it possible to inspect the piston in its upper dead centre position but the height of the engine room may be smaller than would be possible in constructions in which, when the piston is to be withdrawn it has to be raised above the level of the top of the whole cylinder.

What I claim is:—

A cylinder structure for a double acting internal combustion engine comprising a cylinder jacket provided with inlet and exhaust ports and divided into two parts, each of said parts having a separate water jacket, the joint between said parts being disposed adjacent said exhaust port, a liner divided into two parts, the joint between said parts being disposed adjacent said inlet port, and means for connecting said cylinder jacket and liner parts together.

In testimony whereof I have affixed my signature.

GEORGE FERGUSON.